United States Patent [19]

Strikis et al.

[11] Patent Number: 4,589,536
[45] Date of Patent: May 20, 1986

[54] ELECTROMAGNETIC FRICTION CLUTCH

[75] Inventors: Guntis V. Strikis, Belleville; Zaki C. Bekheet, Canton, both of Mich.

[73] Assignee: Ford Motor Company, Dearborn, Mich.

[21] Appl. No.: 647,310

[22] Filed: Sep. 4, 1984

[51] Int. Cl.[4] ............... F16D 47/00; F16D 13/18; F16D 27/10
[52] U.S. Cl. ............................. 192/35; 192/37; 192/48.2; 192/48.3; 192/75; 192/84 T
[58] Field of Search ............... 192/35, 37, 40, 48.2, 192/48.3, 54, 75, 84 T

[56] References Cited

U.S. PATENT DOCUMENTS

| | | | |
|---|---|---|---|
| 614,699 | 11/1898 | Clarke | 192/35 |
| 817,210 | 4/1906 | Williams | 192/35 |
| 1,441,819 | 1/1923 | Moore | 192/75 |
| 2,273,496 | 2/1942 | Perry | 192/35 |
| 2,374,360 | 4/1945 | Lawson | 192/75 |
| 2,481,084 | 9/1949 | Claire | 192/75 |
| 3,078,972 | 2/1963 | Davis et al. | 192/35 |
| 3,149,706 | 9/1964 | Mason et al. | 192/35 |
| 3,177,996 | 4/1965 | Bates | 192/35 |
| 3,275,115 | 9/1966 | Timberlake et al. | 192/35 X |
| 3,685,622 | 8/1972 | Baer et al. | 192/35 |
| 4,201,281 | 5/1980 | MacDonald | 192/35 |
| 4,273,226 | 6/1981 | Takefuta et al. | 192/35 |
| 4,377,224 | 3/1983 | Takata et al. | 192/18 R |
| 4,445,606 | 5/1984 | Van Laningham | 192/106.1 |

Primary Examiner—Rodney H. Bonck
Assistant Examiner—Richard M. Lorence
Attorney, Agent, or Firm—Frank G. McKenzie; Donald J. Harrington

[57] ABSTRACT

An automotive accessory clutch driven by a pulley engaged by a rubber belt driven from the engine includes an electrical coil which when energized causes a friction plate to be drawn into engagement with the pulley and to rotate lever arms about pivots which produce tangentially directed forces on brake assemblies that pivot an additional friction surface into engagement with other surfaces of the driven pulley. The connection between the pulley and the accessory driven from the engine is selectively connected and disconnected as the coil is electrically energized and deenergized.

12 Claims, 6 Drawing Figures

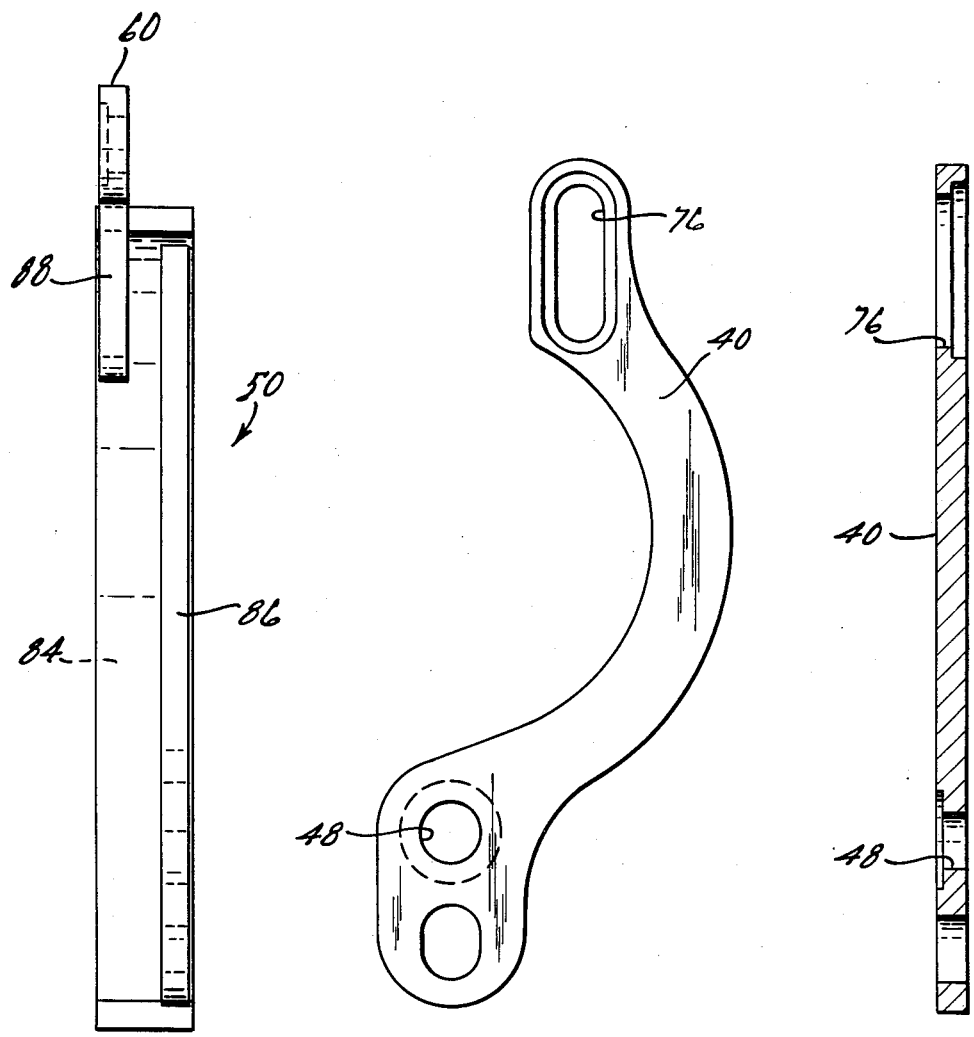

ELECTROMAGNETIC FRICTION CLUTCH

BACKGROUND OF THE INVENTION

1. Field of the Invention

This invention relates to the field of electromagnetically actuated clutches and more particularly pertains to such clutches that use friction clutch elements to make the connection between the driving and driven members.

2. Description of the Prior Art

In the prior art various methods have been used to produce engagement between the driving and driven members of a clutch when an electrical coil is energized. For example, the driving member may be formed with a cylindrical hub adapted to be coupled to the driven member when a shoe is contracted radially into frictional gripping engagement with the hub. The shoe is often surrounded by a helically coiled spring having one end connected to the driven member and having an opposite end or armature end that is moved by magnetic force axially into engagement with the rotatable driving member when an electromagnet is excited. In a clutch operating on this principle, pilot torque is transmitted magnetically between the driving member and the armature end of the spring to turn the armature end of the spring through a short distance. This movement causes the coils of the spring to wrap around the shoe and to contract the shoe into frictional gripping engagement with the hub of the driving member. The shoe, therefore, rotates with the hub and transmits torque to the driven member. The pilot torque transmitted magnetically between the driving member and the armature end of the spring is relatively small and is transferred directly through the spring to the driven member. The pilot torque is amplified by the action of the spring wrapping downwardly around and contracting the shoe; therefore a high percentage of the total transmitted torque is transfered between the driving and driven members by way of the shoe.

Clutches of this general type are disclosed in U.S. Pat. Nos. 3,149,706; 3,177,996; 3,685,622; 4,201,281; 4,273,226; 4,377,224 and 4,445,606.

The clutch described in U.S. Pat. No. 817,210, is selectively actuated by energizing an electrical coil that moves brake shoes into engagement with a friction surface.

In order to improve the torque capacity in clutches of the type that employ electrical energy to produce frictional engagement without amplification, it is necessary that the material of the clutch have high permeability, that the electrical current be increased, that the number of windings in the coil be increased or that the number of magnetic poles be increased. Unfortunately, these changes substantially increase the weight and cost of the clutch and require larger electrical current.

The weight of an electromagnetically actuated friction clutch can be minimized more efficiently by mechanically augmenting the force produced by the electromagnetic that applies the brake shoes to the friction surface on which the driving engagement occurs.

SUMMARY OF THE INVENTION

The electromagnetically actuated friction clutch according to the present invention includes a rotatably mounted driving member having drive surfaces suitable for engagement by friction members and a driven member mounted for rotation about the same axis as the driving member. Power is transmitted between the driving member and the driven member in part through the operation of a plate adapted to engage frictionally and disengage a drive surface on the driving member. A coil connected to a source of electrical current and located in the vicinity of the friction plate moves the plate by magnetic force against the friction surface of the driving member when the coil is electrically energized. Pairs of pivotably mounted clutch shoes located within a housing defined by the driven member are adapted to pivot into frictional engagement with other drive surfaces on the driving member.

Each clutch shoe has an end spaced a considerable distance from the pivot of the clutch shoe and connected mechanically to an end of a lever arm or link that is mounted pivotably. When the coil is energized, a large tangential force resulting from the mechanical advantage inherent in the action of the lever arm is applied to the associated clutch shoe assembly. This force causes the clutch shoe to pivot into frictional engagement with the second drive surface of the driving member.

The clutch shoes are actuated by a force whose magnitude is substantially greater than the force that electromagnetic effects apply to the link due to the lever action of the pivotably mounted link and the lever action inherent in the form of the brake shoe itself. The magnetic force produced by electrical energy is amplified mechanically and produces frictional engagement greatly in excess of the force produced through electrical actuation alone.

BRIEF DESCRIPTION OF THE DRAWINGS

FIG. 4 is an end view of the clutch shoe shown in FIG. 3.

FIG. 5 is a plan view of a lever arm or link for use in the clutch of FIG. 1.

FIG. 6 is an end view of the lever arm shown in FIG. 5.

DESCRIPTION OF THE PREFERRED EMBODIMENT

Figure 1:
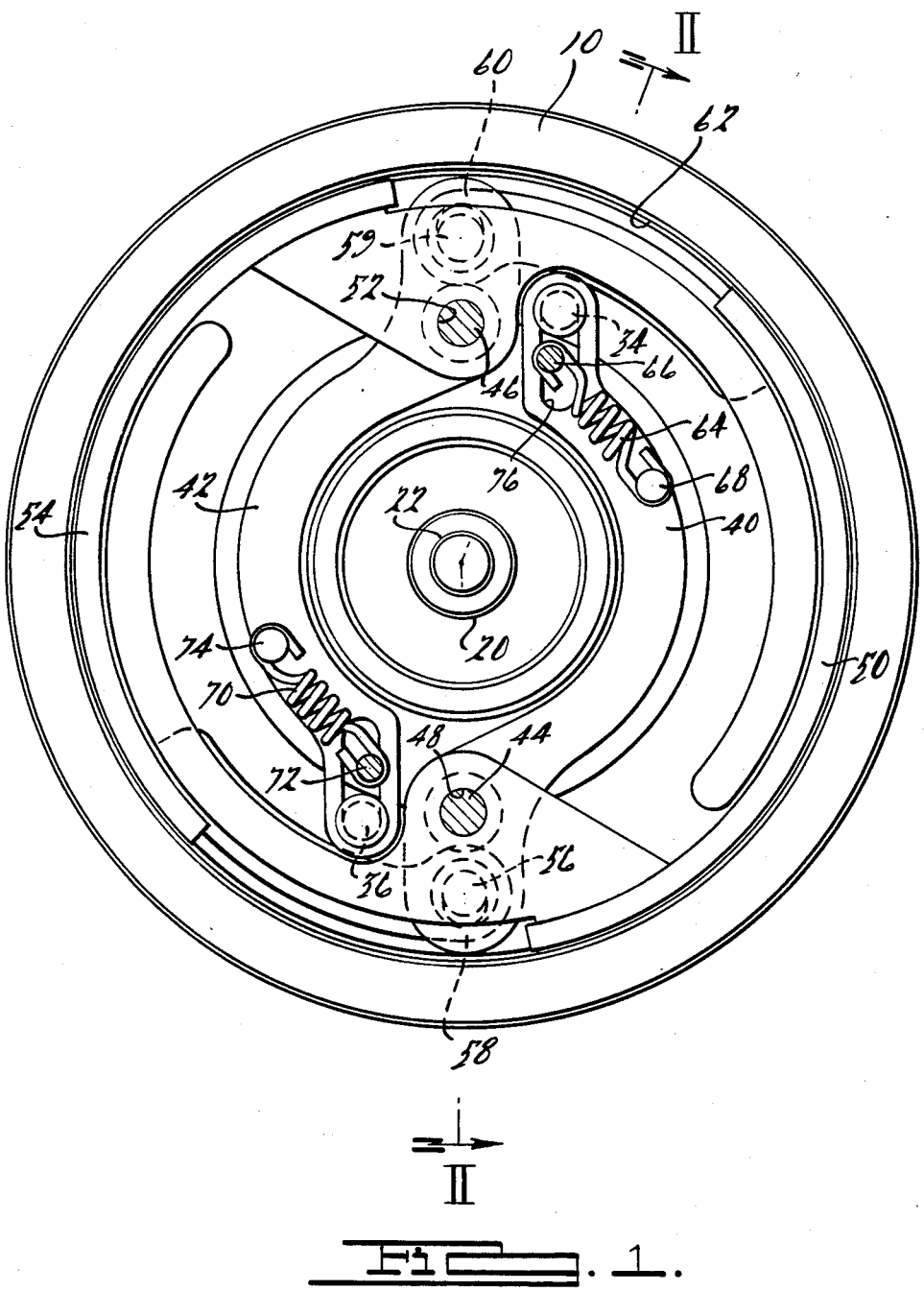
FIG. 1 is an end view of an automotive accessory clutch shown with the retainer plate removed.
Figure 2:
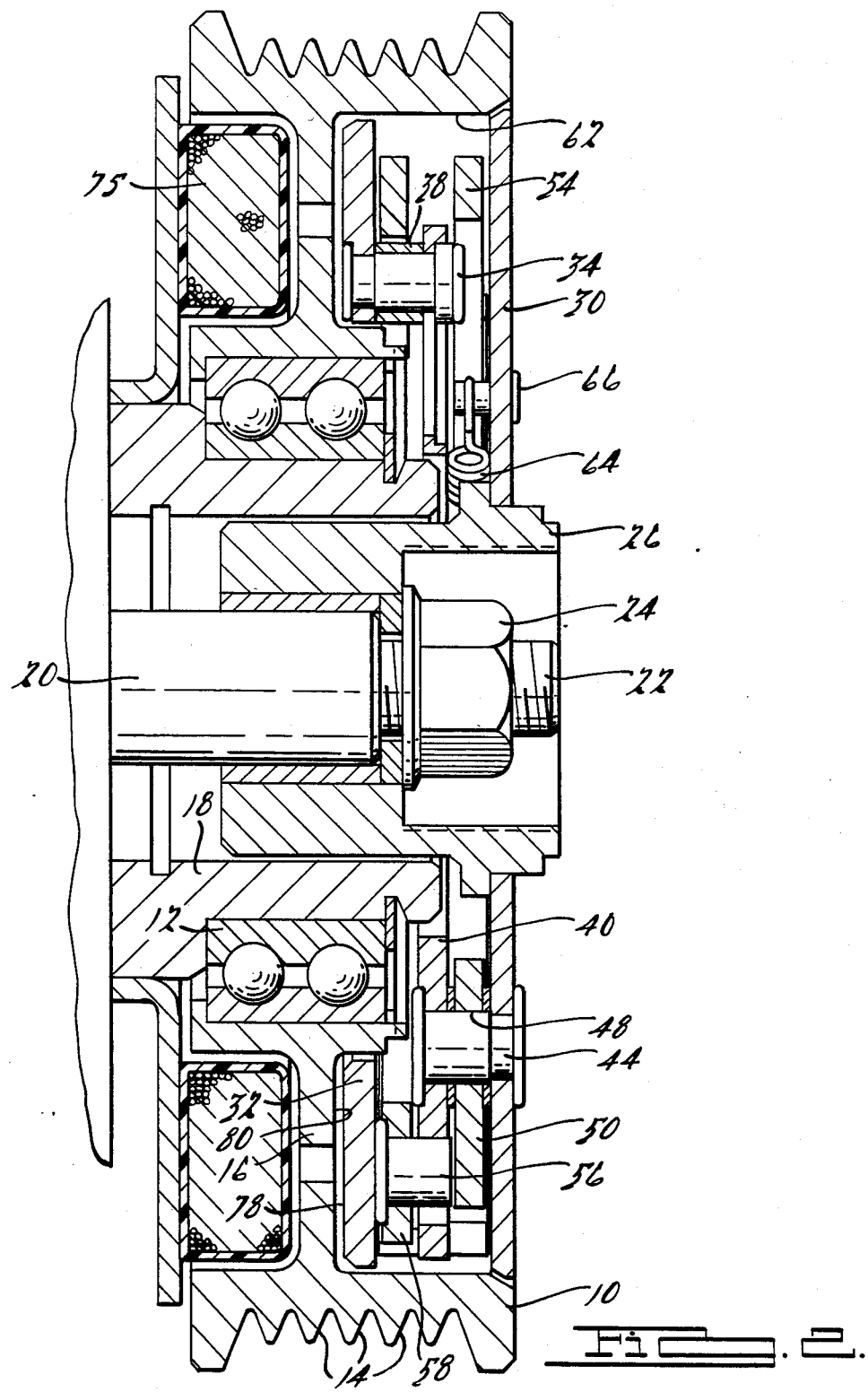
FIG. 2 is a cross section taken at plane II—II of FIG. 1 shown with the retainer plate in place.

Referring to FIGS. 1 and 2, a driving member or a pulley 10, rotatably mounted on a bearing 12 is formed on its outer surface with multiple V-shaped recesses 14, which are engaged by a rubber belt that engages a similar pulley carried on the engine shaft of a motor vehicle. The pulley is formed with a radial web 16, which terminates at its radially inner surface with a cylindrical surface that supports the outer race of bearing 12. The inner race of the bearing is supported on the stationary housing 18 of the compressor that is driven through operation of the cluch. The compressor shaft 20 includes a threaded end portion 22 engaged by a nut 24 which continuously mechanically connects shaft 20 to clutch hub 26. Hub 26, the clutch member that is driven by the pulley when the clutch is engaged, is driveably connected to a retainer or cover plate 30, fitted into a bevelled recess on the edge of pulley 10 for sealing the annular space located between the hub and the pulley against the entrance of foreign objects.

A plate 32, located adjacent one surface of web 16, is adapted to engage driveably by friction the surface of the web. The face of plate 32 is formed with two counterbores and the thickness of the plate has circular holes aligned with the counterbores that extend through the thickness of the plate. Second and fifth pins or rivets 34, 36, fitted within the holes of the friction plate and through spacers 38, connect the friction plate to first and second lever arms or links 40, 42, which are pivotably mounted by first and fourth pins or rivets 44, 46, respectively, to retainer plate 30. Rivet 44 also extends through hole 48 formed in a lug of clutch shoe assembly 50 and rivet 46 also extends through a hole 52 formed in a lug of clutch shoe assembly 54. Rivet 44 provides a connection to retainer plate 30 and a pivot about which lever arm 40 and clutch shoe assembly 50 rotate. Rivet 46 provides a connection to retainer plate 30 about which lever arm 42 and clutch shoe assembly 54 rotate.

The end of lever arm 40 that is adjacent the pivoted connection at rivet 44 is connected by rivet 56 to a lug 58 of clutch shoe assembly 54. Similarly, the end of lever arm 42 that is adjacent the pivoted connection at rivet 46 is connected by sixth pin or rivet 59 to a lug 60 formed on brake shoe assembly 50. Clutch shoe assembly 54, therefore, pivots about the surface of rivet 46 into contact with the cylindrical surface 62 formed on the interior of pulley 10 when third pin or rivet 56 pivots about the surface of rivet 44 due to rivet 34 rotating with pulley 10. Likewise, at the diametrically opposite side of the clutch from the clutch surface of shoe 54, brake shoe 50 rotates about the surface of rivet 44 into contact with the cylindrical surface 62 formed on pulley 10 when rivet 59 pivots about rivet 46 as rivet 36 rotates with pulley 10.

A first tension spring 64 has one end connected to retainer plate 30 by stud 66, which extends through a slotted hole 76 in lever arm 40, and its opposite end connected to a stud 68 carried on lever arm 40. A second tension spring 70 has one end connected to retainer plate 30 by stud 72, which extends through a slotted hole in lever arm 42, and its opposite end connected to stud 74 carried on lever arm 42.

The clutch assembly includes an electrical coil 75 wound about the axis of the compressor shaft and connected to a source of electrical power. When coil 75 is energized, a magnetic field is produced which causes friction plate 32 to move axially bringing its annular surface 78 into contact with the adjacent annular surface 80 of web 16. This causes plate 32 and rivets 34, 36, which are fixed to plate 32, to rotate with the pulley about the axis of the compressor shaft. The lever action of the first link 40, which pivots on the surface of rivet 44 as rivet 34 rotates with plate 32, produces a large tangentially directed force between rivet 56 and clutch shoe assembly 54. This force causes brake shoe 54 to pivot on the surface of the rivet 46 and forces the radially outer surface of the brake shoe against cylindrical surface 62 on the interior of pulley 10. In this way two mechanical advantages, one associated with the lever action of link 40 and the other associated with the lever action of clutch shoe 54, operate when the coil is energized, to force clutch shoe 54 against surface 62. Coil 75 is, therefore, a means for selectively connecting the levers or friction plate and the driving member.

Rivet 36, which is also fixed to plate 32, rotates about the axis of the compressor shaft when the coil is energized and applies a force to the second link 42 tending to pivot link 42 on the surface of rivet 46, thereby producing a large tangentially directed force between rivet 58 and the hole formed in the lug 60 of the clutch shoe assembly 50. This force causes clutch shoe 50 to pivot on the surface of rivet 44, and this movement brings the outer surface of clutch shoe 50 into frictional engagement with cylindrical surface 62 of pulley 10. Therefore, two mechanical advangtages, one associated with the lever action of link 42 and the other associated with the lever action of clutch shoe 50, operate to cause engagement of clutch shoe 50 on pulley surface 62 as a result of rivet 36 rotating with plate 32 when the coil is energized.

When coil 76 is deenergized, the frictional, driving connection between web 16 and plate 32 is discontinued, and the forces tending to hold the surfaces of clutch shoes 50 and 54 against surface 62 are relaxed. Springs 64, 70 become loaded in tension when coil 76 is energized; therefore, when the coil is deenergized the tension force of spring 64 pivots link 40 counterclockwise about the surface of rivet 44, and the rotation of link 40 causes clutch shoe 54 to rotate about the surface of rivet 46 out of contact with cylindrical surface 62. Similarly, the tension force of spring 70 causes link 42 to rotate clockwise about rivet 46 when coil 76 is deenergized, and this rotation applies a force to clutch shoe assembly 50 tending to rotate it counterclockwise about rivet 44, thereby bringing the surface of shoe 50 out of contact with surface 62.

Figure 3:
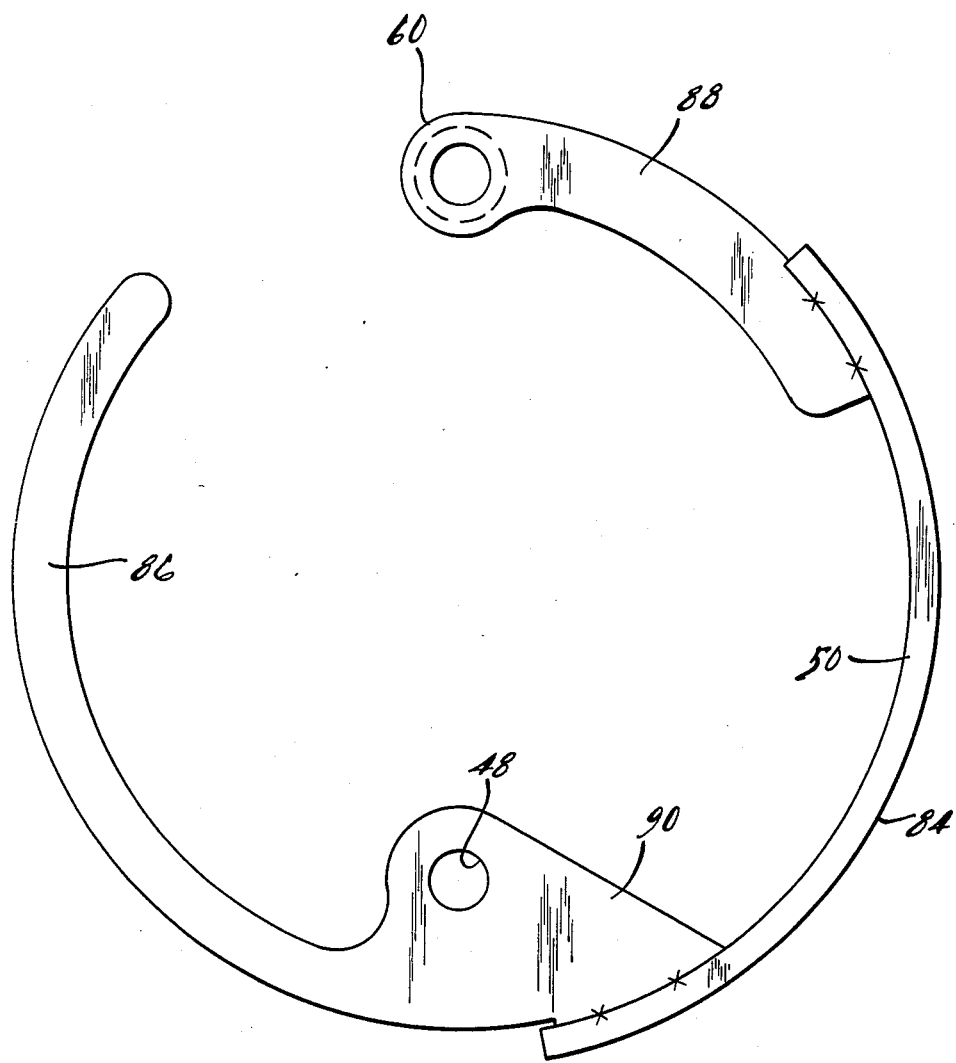
FIG. 3 is a plan view of a clutch shoe for use in the clutch of FIG. 1.

Referring now to FIGS. 3 and 4, which illustrate with respect to shoe assembly 50 the construction that is typical of clutch shoes 50 and 54, each clutch shoe is seen to include an arcuate clutch surface 84 which conforms to the arcuate shape of surface 62 on pulley 10. A counter balance arm 86, formed integrally with the lug that defines hole 48 into which rivet 44 is inserted, is tack welded to brake surface 84. A lug arm portion 88, which is formed integrally with lug 60, is tack welded to the arcuate brake surface 84 at the axially opposite edge from the edge where counter balance arm 86 is welded. The length, configuration and mass of arm 86 is determined by the dynamic balance requirements of the clutch. The moments of inertia of the shoe assemblies in their installed positions are within an acceptable range of tolerance with one another because of the symmetrical arrangement. On assembly, clutch shoe assembly 54 is located with respect to clutch assembly 50 so that the lug that corresponds to lug 90 of clutch assembly 50 is located axially above the lug that corresponds to lug 60 of clutch assembly 50. In this way the clutch assemblies are geometrically identical and their moments of inertia about the principal axes of the clutch assembly can be maintained readily within acceptable limits.

Having described a preferred embodiment of our invention, what we claim and desire to secure by U.S. Letters Patent is:

1. A clutch for selectively coupling and uncoupling rotatable members comprising:
   a rotatably mounted driving member;
   a rotatably mounted driven member;
   a first clutch shoe pivotably mounted for engagement with and disengagement from the driving member;
   first lever means including a first pin a first lever pivotably mounted on the first pin having a first end distant from the first pin selectively connectable to the driving member, and a second end located near the first pin connected to the first clutch shoe eccentric of the pivot of the first clutch shoe;

means for selectively connecting the first lever and the driving member including a friction plate adapted to engage driveably, to disengage and to turn with the driving member, a coil of wire located adjacent the friction plate adapted for connection to a source of electrical current, whereby the friction plate is forced into engagement with the driving member when the coil is energized and is disengaged from the driving member when the coil is deenergized.

2. The cluch of claim 1 wherein the first lever means further includes a second pin that connects the first end of the first lever to the friction plate.

3. The clutch of claim 2 wherein the first lever means further includes a third pin that connects the second end of the first lever to the first clutch shoe.

4. The clutch of claim 1 further including a spring means having one end connected to the first lever radially distant from the first pin and having its other end connected to the driven member, whereby, the spring means are loaded when the coil is energized.

5. The clutch of claim 1 further comprising:
a second cluch shoe pivotably mounted on the driven member having a surface adapted to engage driveably to and disengage the driving member; and
second lever means pivotably mounted on the driven member having one end connected to the friction plate and a second end connected to the second clutch shoe eccentric of the pivot of the second clutch shoe.

6. The clutch of claim 1 wherein the connecting means includes a coil of wire whose axis is aligned with the driving and driven members, the coil being adapted for connection to a source of electrical current and located adjacent the friction plate.

7. A clutch for selectively coupling and uncoupling members comprising:
a rotatably mounted driving member;
a rotatably mounted driven member;
first and second clutch shoes pivotably mounted for engagement with and disengagement from the driving member;
a first lever means including a first pin fixed to the driven member, a first lever pivotably mounted on the first pin having a first end distant from the first pin and selectively connectable to the driving member, and a second end located near the first pin connected to the first clutch shoe eccentric of the pivot of the first clutch shoe;
second lever means including a fourth pin fixed to the driven member, a second lever pivotably mounted on the fourth pin having a first end distant from the first pin selectively connectable to the driving member, and a second end located near the fourth pin connected to the second brake shoe eccentric of the pivot of the second clutch shoe; and means for selectively connecting the first lever and the second lever to the driving member, including a friction plate adapted to engage driveably, to disengage and to turn with the driving member, a coil of wire located adjacent the friction plate adapted for connection to a source of electrical current, whereby the friction plate is forced into engagement with the driving member when the coil is energized and is disengaged from the driving member when the coil is deenergized.

8. The clutch of claim 7 wherein the first lever means further includes a second pin that connects the first end of the first lever to the friction plate and the second lever means further includes a fifth pin that connects the first end of the second lever to the friction plate.

9. The clutch of claim 8 wherein the first lever means further includes a third pin that connects the second end of the first lever to the first clutch shoe and wherein the second lever means further includes a sixth pin that connects the second end of the second lever to the second clutch shoe.

10. The clutch for claim 9 wherein the first clutch shoe is pivotably mounted on the fourth pin, has a first end located radially distant from the fourth pin and is connected to the second end of the first lever by the third pin, and wherein the second cluch shoe is pivotably mounted on the first pin, has a first end located radially distant from the first pin and is connected to the second end of the second lever by the sixth pin.

11. The clutch of claim 7 further including first and second spring means, the first spring means having one end connected to the first lever radially distant from the first pin and having its other end connected to the driven member, the second spring means having one end connected to the second lever radially distant from the fourth pin and having its other end connected to the driven member, whereby the spring means clutch and second brake shoe to pivot out of engagement with the driving said unging of decreases are loaded when the coil is energized.

12. A clutch for selectively coupling and uncoupling members comprising:
a rotatably driving member;
a driven member mounted for rotation about the same axis as the driving member;
a friction plate adapted to engage driveably, to disengage and to turn with the driving member;
means for selectively moving the friction plate into engagement with the driving member;
a first clutch shoe pivotably mounted on the driven member having a surface adapted to engage driveably and to disengage the driving member; and
first lever means pivotably mounted on the driven member having one end connected to the friction plate and a second end connected to the first clutch shoe eccentric of the pivot of the first clutch shoe.

* * * * *

UNITED STATES PATENT AND TRADEMARK OFFICE
CERTIFICATE OF CORRECTION

PATENT NO. : 4,589,536
DATED : May 20, 1986
INVENTOR(S) : Z. C. Bekheet et al

It is certified that error appears in the above-identified patent and that said Letters Patent are hereby corrected as shown below:

Title page:

The inventors are:

Zaki C. Bekheet, Canton, Michigan;

Guntis V. Strikis, Belleville, Michigan; and

Gary N. Benninger, Aurora, Canada

Signed and Sealed this

Nineteenth Day of August 1986

[SEAL]

Attest:

Attesting Officer

DONALD J. QUIGG

Commissioner of Patents and Trademarks